United States Patent [19]
Inoue et al.
[11] 3,811,884
[45] May 21, 1974

[54] PROCESS FOR FORMING IMAGES

[75] Inventors: Eiichi Inoue, Tokyo; Takao Nakayama, Kanagawa; Yutaka Oka; Yasuo Nakai, both of Tokyo, all of Japan

[73] Assignees: Fuji Photo Film Co., Ltd., Kanagawa-ken; Dai Nippon Printing Co., Ltd., Tokyo, both of, Japan; by said Nakayama, Oka, and Nakai

[22] Filed: June 14, 1972

[21] Appl. No.: 262,522

[30] Foreign Application Priority Data

June 18, 1971 Japan.............................. 46-43273
June 18, 1971 Japan.............................. 46-43274

[52] U.S. Cl...................... 96/27 R, 96/48 R, 96/89
[51] Int. Cl........ G03c 5/04, G03c 5/24, G03c 1/72
[58] Field of Search...... 96/89, 48 R, 35, 27, 119 R, 96/119 PQ

[56] References Cited

UNITED STATES PATENTS

| | | | |
|---|---|---|---|
| 1,880,572 | 10/1932 | Wendt et al. | 96/89 |
| 3,690,889 | 9/1972 | Harrison et al. | 96/89 |
| 3,671,252 | 6/1972 | Neumann et al. | 96/89 |
| 3,470,211 | 9/1969 | Csapilla | 96/89 |
| 3,532,638 | 10/1970 | Otis | 96/89 |
| 3,295,974 | 1/1967 | Erdmann | 96/35 |

*Primary Examiner*—Ronald H. Smith
*Assistant Examiner*—Richard C. Schilling

[57] ABSTRACT

An image of an organic coloring agent is formed by imagewise exposing a layer of an organic coloring agent formed on a base to light. Said exposed layer of the organic coloring agent is treated with a solvent to remove the unexposed portions of said layer. Said exposed layer of the organic coloring agent is contacted with an image-receptive material, they are treated with a solvent to transfer the unexposed portions of said layer onto the image-receptive material. By exposing light on the layer of the organic coloring agent, the exposed portions of said layer of the organic coloring agent is colored, discolored or faded.

15 Claims, No Drawings

PROCESS FOR FORMING IMAGES

This invention relates to a process for forming images and more particularly relates to a process for forming images using an organic coloring agent alone.

There have already been developed and proposed various methods for forming images utilizing a color forming reaction by light. For example, there are known a free radical photography and a method wherein Dylux (Trade name, made by Du pont de Nemours & Co.) is used as a color developing material disclosed recently. These methods will be described more particularly.

The former is a method for forming image by producing one of triphenylmethanes by the reaction of the free radical produced by the photodecomposition of a halogen compound and a secondary or tertiary amine as in the case of forming blue image at about 0.01 in ASA unit, when a nitrocellulose film containing, for example diphenylamine and carbon tetrabromide is exposed to light.

The latter is a method for forming desired images by exposing imagewise a layer containing a mixture of an organic coloring agent such as a leuco form of a triphenylmethanic dye, a photooxiding agent, and a photoredox system which does not reduce the photooxidizing agent by itself but forms a reducing agent by the action of light of other wave length than that of the light used for the image exposure and the reducing agent reduces the photooxidizing agent, and thereafter fixing the image by exposing to light capable of forming the above-mentioned reducing agent from the photooxidizing agent.

However, in those methods as mentioned above, there is a defect that such second and third components as the halogen compound or oxidizer must be used in addition to the color forming component since, for example, in the former case, the coloring agent is formed by the free-radical produced by the photodecomposition of the halogen compound and, in the latter case, the coloring agent is formed from the leuco form by the oxidizer and there are further defects that therefore the color forming reaction is carried out in a complicated mechanism as well as the formation of the image is also complicated, and thus it is quite difficult to control the formation of images.

Further since, in the former method described above, a volatile substance as carbon tetrabromide is used for the substance producing a free-radical there are defects that the storage stability after the productions of a photosensitive material is comparatively short and that non-toxicity to human bodies is not well guaranteed.

Further, as the second and third components are used in addition to the color forming components, there are defects that it is very difficult to form a uniform film layer of the color forming component on the base and that therefore it is very difficult to improve the resolving power of the color developing image.

Therefore, an object of the present invention is to form an image by utilizing a coloring agent alone.

Another object of the present invention is to form an image having very high stability.

A further object of the present invention is to form any clear image having high resolving power.

Still other object of the present invention is to simply form an image by a simple manner.

As the results of various investigations of overcoming the aforesaid difficulties and forming desired images by utilizing a photochemical reaction, the inventors have discovered that a layer of an organic coloring agent formed on a base by means of vacuum-evaporating or coating method is exposed through a pattern or image to light whereby the colored, discolored or faded image of the organic coloring agent is formed on the base.

And also, it has been discovered that a layer of an organic coloring agent formed on a base by means of vacuum exploration or coating is exposed through a pattern or image to light and then the exposed layer is treated as it is with a solvent, whereby the unexposed portions are dissolved off to provide the colored, discolored, or faded image of the organic coloring agent. Furthermore, it has been discovered that the layer of the coloring agent as above is, after image exposure, brought into contact with an image receptive material and then they are treated with a solvent, whereby the unexposed portions are transfered onto the image receptive material by the action of the solvent to provide the colored, discolored, or faded image of the organic coloring agent on the image receptive material.

According to the present invention, therefore, there are provided a process for forming images which comprises imagewise exposing a layer of an organic coloring agent on a base to light, a process for forming images which comprises imagewise exposing a layer of an organic coloring agent on a base to light and treating said layer with a solvent to remove the unexposed portions of said layer, and a process for forming images which comprises imagewise exposing a layer of an organic coloring agent on a base to light, contacting an image-receptive material with said layer and treating them with a solvent to transfer the unexposed portions of said layer onto the image-receptive material.

The method of the above mentioned present invention will be explained more particularly in the following.

First of all, in the present invention, a layer of an organic coloring agent alone can be provided on a base by various methods. For example, a layer of the organic coloring agent alone can be formed on a base by a method wherein, for example, the organic coloring agent alone is deposited by an ordinary vacuum-evaporating method or the base is coated by an ordinary method such as, for example, a brush-coating, spatula-coating, casting or roll-coating with a solution prepared by dissolving the organic coloring agent alone in a solvent which dissolves said coloring agent and then the solvent is removed.

In the present invention, any base known to those skilled in the art can be used. There are, for example, a glass plate, any metal plate or foil, any paper or processed paper, wood and any high molecular weight compound film or sheet which may be transparent, translucent or opaque.

By the way, in the present invention, in the case of providing a layer of an organic coloring agent alone on a base by an ordinary vacuum-evaporating or coating method, it is desirable to treat in advance the surface of a base by such known process as washing and degreasing it, for example, with an alkali, organic solvent or chromic acid mixture.

Further, in the present invention, there can be used such organic coloring agent having such property that, when it is exposed with a light, the color will be developed, discolored or faded and that said exposed part and unexposed part are different from each other in the solubility with the solvent as, for example, diphenylmethanic basic dye as Auramine, such triphenylmethanic basic dye as Malachite Green, Brilliant Green, Crystal Violet, Rose Aniline, Victoria Blue and Methyl Violet, such xanthenic basic dye as Rhodamine, Erythrosine, Pyronin G and Eosine B, such thiazinic basic dye as Methylene Blue and Quenothiazine, such acridinic basic dye as Acridine Orange and such coloring agent as lipofurabin.

The coloring agent to be used in the present invention is not in such state as of a leuco form but is itself in a color developing state. When vacuum-evaporation-deposited, the color of the triphenylmethanic basic dye or thiazinic basic dye will become so faint that, when it is exposed with a light absorbed by the coloring agent, the color density become much higher to be likely to form a so-called color developing type image. Even when any of the other coloring agents is vacuum-evaporation-deposited, it will retain a color inherent to the coloring agent and, when it is exposed with a light absorbed by the coloring agent, it will be likely to be discolored or faded or to form a so-called discolored or faded type image.

Further, in the vacuum-evaporation generally the higher the vacuum degree, the higher the physical strength of the vacuum-evaporation-deposited film. However, it is usually desirable to make the vacuum degree lower than $10^{-4}$ torr. It is also desirable to make the evaporating source temperature a little higher than the melting point of the substance to be vacuum-evaporation-deposited, that is, the organic coloring agent.

Further, in the vacuum-evaporating method used in the present invention, in order to make a more compact vacuum-evaporation-deposited thing, it is desirable to make the vacuum-evaporation-depositing velocity rather low.

In the coating method of the present invention, for the solvent to dissolve the organic coloring agent, there can be used any one or mixture of two or more of such known solvents as, for example, hydrocarbons such as hexane, cyclohexane, benzene, toluene or xylene, halogeno-hydrocarbon such as chloroform, carbon tetrachloride, trichloroethylene, monochlorobenzene, O-dichlorobenzene and trichlorobenzene, alcohols, phenols and ethers such as methanol, ethanol, propyl alcohol, butyl alcohol, phenol, dioxane, tetrahydrofuran, ethyleneglycol and propyleneglycol, acid or its esters such as acetic acid, methyl acetate, ethyl acetate and butyl acetate, ketones such as acetone, methyl ethyl ketone and methyl isobutyl ketone and other solvent such as nitrobenzene, dimethyl formamide, dimethyl sulfoxide and water.

In the present invention, the concentration of the organic coloring agent dissolved in the solvent described above is not specifically limited, for example, because the supernatant liquid of the solution prepared by dissolving it can be also used. However, preferably concentration is from about 1.0 to about 0.01 g./1.

Further, in the above mentioned present invention, the thickness of the film layer of the organic coloring agent alone is not limited but is preferably from about 0.1 to about 10 microns.

Now, in the present invention, when a layer of an organic coloring agent alone is provided on a base and is then exposed with a light absorbed by the coloring agent in the film layer such as a light by such ordinary method as a contact light-exposing method or a projection light-exposing method through an optical system through a pattern, the color in the film layer in the exposed part will be developed, discolored or faded to form any visible image.

In the above description, the exposing light source may be either an ultraviolet light or visible light. Further, there can be used infrared rays and, for example, a mercury lamp, Xenon lamp, tungsten lamp or infrared lamp.

Then, in the present invention, after being exposed with the light absorbed by the coloring agent, a solvent is applied to said irradiated surface as it is by a known coating method such as, for example, a brush-coating, spray-coating, dip-coating, casting or roll-coating so that the film layer in the unexposed part may be selectively dissolved and removed to form a permanent visible image. Further, in the present invention, after being irradiated with the light absorbed by the coloring agent, said exposed surface has contacted with a bse material to which a transfer can be made placed on it and a solvent is applied to said exposed surface by such conventional coating method from either the side of said base material or the other side so that the layer in the unexposed part may be dissolved by said solvent and, at the same time a selective solvent-transfer may be made onto the base material to form permanent visible images.

In the solvent-treatment in the present invention, the solvent is different depending on the organic coloring agent to be used. But any solvent having a property of selectively dissolving the film layer in the non-irradiated part can be used. For such solvent, there can be used, for example, a solvent which satisfies such property as is mentioned above and which is selected from among the solvents used in the case of dissolving the organic coloring agent.

In the present invention, a solvent having a strong polarity generally tends to simultaneously dissolve both of the exposed part and the unexposed part, a solvent having a weak polarity tends to be comparatively difficult to dissolve the film layer in the exposed part and to comparatively dissolve the film layer in the unexposed part, and a non-polar solvent tends to be difficult to dissolve the film layer in either of the exposed part and unexposed part.

Therefore, in the present invention, it is desirable that, in the case of forming an image by exposing the film layer with a light absorbed by the coloring agent and then treating said exposed surface as it is with a solvent, a solvent having weak polarity is generally used for such solvent to selectively dissolve and remove the film layer in the non-irradiated part to form a permanent visible image by said coloring agent developed, discolored or faded in the film layer in the exposed part on the base.

Further, in the present invention, it is desirable that, in the case of forming an image by exposing the film layer with a light absorbed by the coloring agent and then making a solvent-transfer with solvent by placing a base material to which a transfer can be made on said irradiated surface, a solvent having weak polarity is used for such a solvent to dissolve the film layer in the unexposed part and to selectively transfer said film layer onto the base material to which a transfer can be made to form a permanent visible image on the base and, on the other hand, to form an image by the coloring agent in the unexposed part on the base material to which a transfer can be made.

For the solvent having a weak polarity described above, there can be used, for example, acids such as acetic acid, boric acid, oxalic acid or hydrogen peroxide water, an aqueous solution of salt such as ammonium chloride or ammonium nitrate, hydrocarbons such as toluene, xylene, hexane or cyclohexane, halogeno-hydrocarbon such as trichloroethylene or esters such as ethyl acetate or butyl acetate.

In the present invention, as the solvent for the solvent treatment, there can be used two or more solvents as mixed to adjust the dissolving property. Further, there can be used not only such solvent having a weak polarity described above but also the solvent having a weak polarity and a solvent having a strong polarity or non-polar solvent as freely mixed to adjust the dissolving property.

Now, as the base material to which a transfer can be made in the solvent-treatment, there can be used a conventional thing such as, for example, any paper or processed paper, cellulose film, a glass plate, any metal plate or foil, wood or any high molecular weight compound film or sheet.

However, in the present invention, for the solvent-treatment and transfer, it is preferable that either of the base and base material is always penetrable with or adsorbe the solvent.

The mechanism in which the film layer in the non-irradiated part is selectively dissolved and removed by the solvent-treatment is not yet clear but is presumed to be because, when the film layer of the organic coloring agent alone is irradiated with a light or heat energy, the coloring agent in said irradiated part will change to the condition stable against the solvent that a difference in the solubility of the film layer with the solvent will be produced between said irradiated part and non-irradiated part.

Further, in the present invention, when a film layer of an organic coloring agent alone is formed on any base by a vacuum-evaporating method or a coating method from a solution and is then irradiated with a light or heat energy through a pattern and then said irradiated surface is treated as it is with a solvent, the film layer in the non-irradiated part will be dissolved and removed and, when the film layer in the irradiated part is left on the base so that any image by the organic coloring agent alone may be formed on the base and then said image surface with a base material to which a transfer can be made placed on it is treated with a solvent or heat, the image on the base will be transferred by the solvent or heat onto the base material to which a transfer can be made to form a permanent visible image having a very high resolving power by the organic coloring agent alone on the base material to which a transfer can be made.

Also, in the present invention, as mentioned above, a film layer of an organic coloring agent alone is formed on any base by a vacuum-evaporating method or a coating method from a solution and is then irradiated with a light or heat energy through a pattern and then said irradiated surface with a base material to which a transfer can be made placed on it is treated with a solvent so that the film layer in the non-irradiated part may be transferred by the solvent onto the base material, the film layer in the irradiated part is left on the base so that permanent visible images of a very high resolving power may be formed on the base and base material and further the base with the base material placed on it is treated with a solvent or heat so that the image on the base may be transferred by the solvent or heat onto the base material to form a permanent visible image having a very high resolving power by the organic coloring agent alone on the base material.

In the present invention, in the case that the base material to which a transfer can be made is placed on the surface treatment with the solvent so that an image may be formed by a solvent-transfer as mentioned above, as the image already formed on the base is the film layer on the irradiated part, it is desirable to use a solvent strong in the polarity and tending to dissolve the film layer.

For such solvent having a strong polarity, there can be used solvents such as, for example, methanol, ethanol, acetone or methyl ethyl ketone.

Further, in the case of forming an image by a heat-transfer by overlapping the base material to which a transfer can be made as mentioned above, the heating temperature is different depending on the kind of the organic coloring agent, base or base material used but is preferably about 130° to 300°C.

As evident from the above explanation, in the method of the present invention, when only a film layer of an organic coloring agent alone is exposed with such light absorbed by said coloring agent as a light, the color in the exposed part will be directly developed, discolored or faded so that any visible image may be formed without carrying out any image developing operation.

Also, in the method of the present invention, when a film layer of an organic coloring agent alone provided by a vacuum-evaporating method or a coating method from a solution is exposed to a light to form an image and is then treated with a solvent, the film layer in the unexposed part will be dissolved and removed or will be transferred by the solvent so that any permanent visible image may be formed on the base or base material to which a transfer can be made.

In the present invention, as a film of an organic coloring agent alone is formed by a vacuum-evaporating method or a coating method from a solution as mentioned above, the film layer provided on the base is a uniform film of the coloring agent and, as an image is formed by utilizing such uniform film of the coloring agent, the image obtained above is very high in the resolving power and is clear, uniform and stable.

Further, in the present invention, in case an image is formed by dissolving and removing or solvent-transferring the film layer in the unexposed part by utilizing the difference in the solubility of the film layer with the solvent between the exposed part and unexposed part, the base or base material itself to which a transfer can be made will be exposed, therefore the contrast between the image part and non-image part will increase and the image property will be remarkably improved.

Further, in the present invention, by selecting the organic coloring agent, a positive image can be obtained from a negative image or a positive image can be obtained from a positive image and particularly, in the case of forming an image by a solvent-transfer, there is an advantage that a negative image and positive image can be simultaneously formed and, in the case of dissolving and removing the film layer, there is an advantage that, if the organic coloring agent is selected and the film in the unexposed part is removed, a negative-positive image will be able to be formed.

Now, in the present invention, as a film layer of an organic coloring agent alone is only provided on a base, its formation is simplified, such second and third components as, for example, a binder, substance producing a free group or oxidizer are not used at all, therefore no unstable element by them is recognized and there is an advantage that the handling is very simple.

Further, in the case of forming an image by placing the base material to which a transfer can be made on the surface treated with the solvent, the color image can be all transferred onto the base material to which a transfer can be made and there is an advantage that both negative and positive images can be formed.

The method of the present invention is a novel image forming method not seen in any conventional method and has an extensive application field.

There are uses such as, for example, for various mask materials and precise patterns or displays for letters, screens and other complicated designs. Particularly, such transparent base as a glass plate on which an image is formed is very important as a color mask for I.C. (integrated circuits).

Examples are given in the following to more concretely explain the method of the present invention.

EXAMPLE 1

A uniform photosensitive material of a film thickness of 0.26 micron was made by vacuum-evaporation depositing a Malachite Green hydrochloride on a glass plate of a thickness of about 0.5 mm. well degreased and washed by being dipped in a chromic acid mixture while gradually elevating the evaporating source voltage to 2 volts at a vacuum degree of $10^{-4}$ torr. Then this photosensitive material had a pattern brought into close contact with it with a vacuum printing frame and was exposed to a light for about 3 minutes at a distance of about 10 cm. by using a superhigh voltage mercury lamp of 250 watts as a light source. The exposed part developed a thick green color from a very thin green color at the time of the evaporation to obtain a clear negative-positive image. This image was a green image having a maximum absorption near 500 mμ.

EXAMPLE 2

A uniform photosensitive material of Crystal Violet of a film thickness of 0.13 microns was made with the same base plate and evaporating operation as in Example 1. When this photosensitive material was then pattern-exposed in the same manner as in Example 1, the exposed part developed a very thick blue color (or a density of 0.17) from a thin blue color (of a density of 0.03) at the time of the evaporation to obtain a blue image having an absorption maximum near 600 mμ.

EXAMPLE 3

A uniform photosensitive material of Rhodamine of a film thickness of 0.13 micron was made with the same base plate and evaporating operation as in Example 1. When this photosensitive material was then pattern-exposed in the same manner as in Example 1, the exposed part discolored to a reddish orange color having a maximum absorption at 510 mμ from a reddish purple color having a maximum absorption at 580 mμ at the time of the evaporation to obtain a clear image.

EXAMPLE 4

A uniform photosensitive material of Auramine of a film thickness of 0.15 micron was made with the same base plate and evaporating operation as in Example 1. When this photosensitive material was then pattern-exposed in the same manner as in Example 1, the exposed part was decolored to obtain a clear positive-negative image which was a yellow image having a maximum absorption at 450 mμ.

EXAMPLE 5

A uniform photosensitive material of Methylene Blue was made with the same base plate and evaporating operation as in Example 1. Then this photosensitive material had a ready-made pattern brought into close contact with it with a vacuum-printing frame and was irradiated with infrared rays for about 10 minutes at a distance of about 5 cm. by using an infrared ray lamp of 100 watts as a heat source. When the photosensitive body thus absorbed the heat energy, it developed a thick blue color from a thin blue color at the time of the evaporation to obtain a clear image.

EXAMPLE 6

A methyl alcohol solution of Pyronin G was applied onto a glass plate of a thickness of about 0.5 mm. well degreased and washed by being dipped for about 10 minutes in a sodium hydroxide solution and was naturally dried to perfectly evaporate the solvent to make a photosensitive material. When this photosensitive material was pattern-exposed in the same manner as in Example 1 through a pattern, the exposed part discolored to a reddish orange color having a maximum absorption at 540 mμ from a reddish purple color having a maximum absorption at 570 mμ at the time of the applying to obtain a clear image.

EXAMPLE 7

An uniform photosensitive material of Crystal Violet of a film thickness of 0.13 micron was made by the same vacuum-evaporating operation as in Example 1 on a polyester film (of a thickness of about 1 mm.) washed on the surface with a carbon tetrachloride solution. When it was pattern-exposed in the same manner as in Example 1, a clear blue image having a maximum absorption near 600 mμ was obtained.

EXAMPLE 8

A methyl alcohol solution of Eosine B was applied onto a glass plate of a thickness of about 0.5 mm. well degreased and washed by being dipped for about 10 minutes in a sodium hydroxide solution and was naturally dried to perfectly remove the solvent to make a photosensitive material. When this photosensitive material was pattern-exposed in the same manner as in Example 1 through a pattern, the exposed part developed a thick yellow color from a thin yellow color at the time of the applying to obtain a clear image.

EXAMPLE 9

Crystal Violet was vacuum-evaporation deposited on a glass plate of a thickness of about 0.3 mm. well degreased and washed by being dipped in a chromic acid mixture while gradually elevating the evaporating source voltage to 2 volts at a vacuum degree of $10^{-4}$ torr to make a photosensitive material of a film thickness of 0.13 micron. Then this photosensitive material had a pattern brought into close contact with it with a vacuum printing frame and was exposed to a light for about 3 minutes at a distance of about 10 cm. by using a superhigh voltage mercury lamp of 250 watts as a light source. The exposed part developed a very thick blue color from a thin blue color at the time of the evaporation and, when it was dipped for about 5 seconds in an aqueous solution of 50 percent hydrogen peroxide, the thin blue part of the non-exposed part dissolved out of the photosensitive material surface and a clear blue image having a maximum absorption near 600 mμ was obtained.

EXAMPLE 10

A uniform photosensitive material of Rhodamine of a film thickness of 0.13 micron was made by the same a vacuum-evaporating operation on the same base plate as in Example 9 by the same method as in the above mentioned Example 9. When this photosensitive material was image-exposed to a light through a pattern in the same manner as in Example 9, the exposed part discolored to a reddish orange color from a bluish purple color at the beginning. When it was dipped for about 5 seconds in an aqueous solution of 50 percent hydrogen peroxide, the non-exposed reddish purple part was perfectly dissolved and removed and a clear reddish orange image having a maximum absorption at 510 mμ was obtained.

EXAMPLE 11

A uniform photosensitive material of Pyronin G of a film thickness of 0.16 micron was made by a vacuum-evaporating operation on the same base plate as in Example 9 by the same method as in Example 9. When this photosensitive material was then image-exposed to a light through a pattern in the same manner as in Example 9, the exposed part discolored to a reddish orange color from a reddish purple color at the time of the vacuum-evaporation. When it was dipped for about seconds in ethyl acetate, the non-exposed reddish purple color part was perfectly dissolved and removed and a clear reddish orange image having a maximum absorption of 540 mμ was obtained.

EXAMPLE 12

A uniform photosensitive material of Methylene Blue of a film thickness of 0.11 micron was made by a vacuum evaporating operation on the same base plate as in Example 9 by the same method as in Example 9. When this photosensitive material was then irradiated at a distance of about 10 cm. for about 2 minutes with an infrared lamp of 100 watts through a pattern. the part having absorbed the heat energy developed a very thick blue color from a thin blue color at the beginning. When it was dipped for about 5 seconds in an aqueous solution of 20 percent acetic acid, the non-developing part was perfectly dissolved and removed and a clear blue image was obtained.

EXAMPLE 13

A methyl alcohol solution of 0.1 percent Rhodamine was applied onto an aluminum plate well degreased and washed by being dipped for about 10 minutes in a sodium hydroxide solution and was naturally dried to make a photosensitive material. When this photosensitive material was then image-exposed to a light through a pattern in the same manner as in Example 9, the exposed part discolored to a reddish-orange color from a bluish purple color at the beginning. When it was dipped for about 5 seconds in an aqueous solution of 20 percent acetic acid, the non-exposed part was perfectly dissolved and removed and a clear reddish orange image was obtained.

EXAMPLE 14

A uniform photosensitive material of Crystal Violet of a film thickness of 0.13 micron was made by the same vacuum-evaporating operation as in Example 9 on a polyester film (of a thickness of about 1 mm.) washed on the surface with a carbon tetrachloride solution. When it was pattern-exposed to a light in the same manner as in Example 9, the exposed part developed a very thick blue color from a thin blue color at the time of the evaporation. When it was dipped for about 15 seconds in toluene, the non-exposed part perfectly dissolved out and a clear blue image having a maximum absorption near 600 mμ was obtained.

EXAMPLE 15

A uniform photosensitive material of Auramine of a film thickness of 0.15 micron was made by the same vacuum-evaporating operation as in Example 9 on an aluminum plate well degreased and washed by being dipped for about 10 minutes in a sodium hydroxide solution. When it was then pattern-exposed to a light in the same manner as in Example 9, the exposed part disappeared to be colorless from yellow at the time of the evaporation. When it was then dipped for about 10 seconds in an aqueous solution of 20 percent hydrogen peroxide, the yellow part of the non-exposed part dissolved perfectly and, when the exposed part was decolored, it again returned to be yellow and a clear yellow image was obtained.

EXAMPLE 16

An ethyl alcohol solution of 0.1 percent Pyronin G was applied onto an aluminum plate well degreased and washed by being dipped for about 10 minutes in a sodium hydroxide solution and was naturally dried to make a photosensitive material. When it was then image-exposed to a light through a pattern in the same manner as in Example 9, the exposed part discolored to a reddish orange color from a reddish purple color at the beginning. When it was dipped for about 10 seconds in an aqueous solution of 10 percent ammonium chloride, the reddish purple part of the non-exposed part was perfectly dissolved and removed and a clear reddish orange image having a maximum absorption at 540 mμ was obtained.

EXAMPLE 17

A photosensitive material was made of Pyronin G in the same manner an in Example 11 and was pattern-exposed to a light. Then a high quality paper (of 52.5 g./$m^2$) was brought into close contact with the color image surface of this photosensitive material and was rubbed uniformly two or three times on the back with an absorbent cotton impregnated with ethyl acetate. The non-exposed reddish purple part dissolved out into the ethyl acetate and moved at the same time to the high quality paper to obtain a clear reddish orange positive image on the photosensitive body and a reddish purple negative image on the high quality paper.

EXAMPLE 18

A photosensitive material was made of Rhodamine B in the same manner as in Example 10 and was pattern-exposed to a light. Then a high quality paper (of 52.5 g./m$^2$) was brought into close contact with the color image surface of this photosensitive material and was rubbed uniformly two or three times on the back with an absorbent cotton impregnated with an aqueous solution of 50 percent hydrogen peroxide. The non-exposed reddish purple part dissolved out into the aqueous solution of hydrogen peroxide and moved at the same time to the high quality paper to obtain a clear reddish orange image on the photosensitive material.

EXAMPLE 19

The photosensitive material of Crystal violet made in Example 9 was image-exposed to a light in the same manner as in Example 9 and was treated with a solvent to form a blue image. Then a high quality paper (of 52.5 g./m$^2$.) was brought into close contact with the color image surface of this photosensitive material and was rubbed uniformly on the back surface with an absorbent cotton impregnated with ethyl alcohol. Then the blue image of Crystal Violet dissolved out into the ethyl alcohol and moved at the same time perfectly to the high quality paper to form a blue image on the high quality paper. Nothing remained on the photosensitive base material.

EXAMPLE 20

A photosensitive material of Rhodamine made in Example 10 was image-exposed to a light and treated with a solvent in the same manner as in Example 10. When a high quality paper (of 52.5 g./m$^2$.) was then brought into close contact with the color image surface of this photosensitive material and was rubbed uniformly on the back surface with an absorbent cotton impregnated with ethyl alcohol, the reddish orange image of Rhodamine dissolved out into the ethyl alcohol and moved at the same time perfectly to the high quality paper to form a reddish orange image on the high quality paper. Nothing remained on the photosensitive base.

EXAMPLE 21

A photosensitive material was made of Pyronin G and pattern-exposed to a light in the same manner as in Example 11 and was treated with a solvent in the same manner as in Example 17 to form images on the high quality paper and photosensitive base material. When the high quality paper (of 52.5 g./m$^2$.) was then brought into close contact with the color image surface of this photosensitive base material and was rubbed uniformly on the back with an absorbent cotton impregnated with ethyl alcohol, the reddish orange image of Pyronin G dissolved out into the ethyl alcohol and moved at the same time perfectly to the high quality paper to form a reddish orange image on the high quality paper. Nothing remained on the photosensitive base.

EXAMPLE 22

A photosensitive material was made of Rhodamine and pattern-exposed to a light in the same manner as in Example 10 and was treated with a solvent in the same manner as in Example 17 to form images on the high quality paper and photosensitive base material. When the high quality paper (of 52.5 g./m$^2$.) was then brought into close contact with the color image of this photosensitive base material and was rubbed uniformly on the back with an absorbent cotton impregnated with ethyl alcohol, the reddish orange image of Rhodamine B dissolved out into the ethyl alcohol and moved at the same time perfectly to the high quality paper to form a reddish orange image on the high quality paper. Nothing remained on the photosensitive base.

EXAMPLE 23

The photosensitive material of Rhodamine made in Example 10 was image-exposed to a light and treated with a solvent in the same manner as in Example 10 to form a reddish orange image. When a high quality paper (of 52.5 g./m$^2$.) was brought into close contact with the color image surface of this photosensitive material and the photosensitive body was heated and pressed on the back surface for about 20 seconds with an iron heated to about 180°C., the reddish orange image remaining on the photosensitive material moved perfectly to the high quality paper to form a reddish orange image on the high quality paper. Nothing remained on the photosensitive base.

EXAMPLE 24

The photosensitive material of Crystal Violet made in Example 9 was image-exposed to a light and treated with a solvent in the same manner as in Example 9 to form a blue image. When a high quality paper (of 52.5 g./m$^2$.) was brought into close contact with the color image surface of this photosensitive material and the photosensitive material was heated and pressed on the back surface for about 20 seconds with an iron heated to about 200°C., the blue image remaining on the photosensitive material moved perfectly to the high quality paper to form a blue image on the high quality paper. Nothing remained on the photosensitive base.

EXAMPLE 25

The photosensitive material of Pyronin G made in Example 17 was image-exposed to a light and treated with a solvent in the same manner as in Example 17 to form a reddish purple image on the high quality paper and a reddish orange image on the photosensitive material. When the high quality paper (of 52.5 g./m$^2$) was brought into close contact with the color image surface of this photosensitive body and the photosensitive material was heated and pressed on the back surface for about 20 seconds, with an iron heated to about 190°C., the reddish orange image remaining on the photosensitive material moved perfectly to the high quality paper to form a reddish orange image on the high quality paper. Nothing remained on the photosensitive base.

EXAMPLE 26

The photosensitive material of Rhodamine made in Example 10 was image-exposed to a light in the same manner as in Example 10. Then a high quality paper (of 52.5 g./m$^2$.) was brought into close contact with the color image surface of this photosensitive material and was rubbed uniformly two or three times on the back with an absorbent cotton impregnated with ethyl acetate. The non-exposed bluish purple part dissolved out into the ethyl acetate and moved at the same time to the high quality paper to obtain a clear reddish orange positive image on the photosensitive material and a bluish purple negative image on the high quality paper. When the high quality paper was brought into close contact with the color image surface of this photosensitive material and the photosensitive material was heated and pressed on the back surface for about 20 seconds with an iron heated to about 180°C., the reddish orange image remaining on the photosensitive material moved perfectly to the high quality paper to form a reddish orange image on the high quality paper. Nothing remained on the photosensitive base.

What we claim is:

1. A process for forming images which comprises: imagewise exposing a layer of an organic coloring agent on a base to light, said coloring agent being selected from the group consisting of diphenylmethanic, triphenylmethanic, xanthenic, thiazinic and acridinic dyes, and treating said layer with a solvent to remove the unexposed portions of said layer.

2. A process as claimed in claim 1 wherein the thickness of said layer of organic coloring agent is 0.1 to 10 $\mu$.

3. A process as claimed in claim 1 wherein the layer of the organic coloring agent is formed by a conventional method such as vacuum evaporating and coating methods.

4. A process as claimed in claim 1 wherein said solvent is one having a weak polarity.

5. A process for forming images which comprises: imagewise exposing a layer of an organic coloring agent on a base to light, said coloring agent being selected from the group consisting of diphenylmethanic, triphenylmethanic, xanthenic, thiazinic and acridinic dyes, contacting an image-receptive material with said layer and treating them with a solvent to transfer the unexposed portions of said layer onto the image-receptive material.

6. A process as claimed in claim 5 wherein said dyes are basic.

7. A process as claimed in claim 5 wherein said organic coloring agent is selected from Auramine, Malachite Green, Brilliant Green, Crystal Violet, Rose Aniline, Victoria Blue, Methyl Violet, Rhodamine, Erythrosine, Pyronin G, Eosin B Methylene Blue, Quenothiazine, Acridine Orange and lipofurabin.

8. A process as claimed in claim 5 wherein the thickness of said layer of organic coloring agent is 0.1 to 10 $\mu$.

9. A process as claimed in claim 5 wherein the layer of the organic coloring agent is formed by a conventional method such as vacuum evaporating and coating methods.

10. A process as claimed in claim 5 wherein said dyes are basic.

11. A process as claimed in claim 5 wherein said organic coloring agent is selected from Auramine, Malachite Green, Brilliant Green, Crystal Violet, Rose Aniline, Victoria Blue, Methyl Violet, Rhodamine, Erythrosine, Pyronin G, Eosin B Methylene Blue, Quenothiazine, Acridine Orange and lipofurabin.

12. A process as claimed in claim 5 wherein the image-receptive material is selected from paper, cellulose film, glass plate, metal sheet, resin film and resin sheet.

13. A process for forming images which comprises:

imagewise exposing a layer of an organic coloring agent on a base to light, said coloring agent being selected from the group consisting of diphenylmethanic, triphenylmethanic, xanthenic, thiazinic and acridinic dyes, said organic coloring agent, upon exposure to light producing a different in solubility between exposed and unexposed portions and treating said layer with a solvent to remove the unexposed portions of said layer.

14. The process of claim 13 wherein said dyes are basic.

15. The process of claim 13 wherein said organic coloring agent is selected from Auramine, Malachite Green, Brilliant Green, Crystal Violet, Rose Aniline, Victoria Blue, Methyl Violet, Rhodamine, Erythrosine, Pyronin G, Iosin B, Methylene Blue, Quenothiazine, Acridine Orange and lipfurabin.

* * * * *